US008667323B2

(12) United States Patent
Havewala et al.

(10) Patent No.: US 8,667,323 B2
(45) Date of Patent: Mar. 4, 2014

(54) PROACTIVE ERROR SCAN AND ISOLATED ERROR CORRECTION

(75) Inventors: Sarosh C. Havewala, Kikrland, WA (US); Neal R. Christiansen, Bellevue, WA (US); John D. Slingwine, Duvall, WA (US); Daniel Chan, Redmond, WA (US); Craig A. Barkhouse, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 12/970,954

(22) Filed: Dec. 17, 2010

(65) Prior Publication Data
US 2012/0159243 A1 Jun. 21, 2012

(51) Int. Cl.
*G06F 11/00* (2006.01)
(52) U.S. Cl.
USPC ........... 714/6.11; 714/6.1; 714/6.2; 714/6.21; 714/6.31; 714/21; 714/25; 714/40; 714/42; 714/54
(58) Field of Classification Search
USPC ........... 714/6.1, 6.11, 6.2, 6.21, 6.3, 6.31, 21, 714/25, 40, 42, 54
See application file for complete search history.

(56) References Cited

U.S. PATENT DOCUMENTS

| 7,032,123 B2 * | 4/2006 | Kane et al. ............... 714/5.11 |
| 7,143,120 B2 * | 11/2006 | Oks et al. ............... 707/679 |
| 7,389,379 B1 * | 6/2008 | Goel et al. ............... 711/112 |
| 7,506,213 B1 * | 3/2009 | Cabrera et al. ............... 714/42 |
| 7,739,447 B1 * | 6/2010 | Rodrigues ............... 711/114 |
| 7,930,491 B1 * | 4/2011 | Xu et al. ............... 711/154 |
| 8,074,103 B2 * | 12/2011 | Dilman et al. ............... 714/6.1 |
| 2004/0054989 A1 * | 3/2004 | Harres ............... 717/124 |
| 2005/0039144 A1 | 2/2005 | Wada et al. |
| 2005/0246612 A1 * | 11/2005 | Leis et al. ............... 714/763 |
| 2005/0257131 A1 | 11/2005 | Lim et al. |
| 2006/0218500 A1 | 9/2006 | Sauve et al. |
| 2007/0157118 A1 | 7/2007 | Wuttke |
| 2008/0263474 A1 | 10/2008 | Wormald |
| 2009/0089628 A1 * | 4/2009 | Day et al. ............... 714/54 |
| 2009/0164922 A1 | 6/2009 | Phakousonh et al. |

OTHER PUBLICATIONS

Gunderloy, Mike, "Do You Need a Site-Specific Browser?", Retrieved at << http://gigaom.com/collaboration/do-you-need-a-site-specific-browser/ >>, Dec. 13, 2007, pp. 8.
Perez, Sarah, "The Future of Firefox Personas: Dynamically Changing and Filled with Ambient Info", Retrieved at << http://www.readwriteweb.com/archives/the_future_of_firefox_personas_dynamically_changin.php >>, Mar. 4, 2010, pp. 2.

* cited by examiner

*Primary Examiner* — Joshua P Lottich (57) ABSTRACT

Processing for file system volume error detection and processing for resultant error correction are separated to support system availability and user satisfaction. File system volumes for storing data structures are proactively scanned while the volumes remain online to search for errors or corruptions thereon. Found errors are scheduled to be corrected, i.e., spot corrected, dependent on the severity of the identified errors, error correction scheduling and/or at the determination of a file system administrator and/or user, to assist in maintaining minimal user and file system impact. When spot correction is initialized, one file system volume at a time is taken offline for correction. Spot correction verifies prior logged corruptions for the offline volume, and if independently verified, attempts to correct the prior noted corruptions. Volumes are retained offline only for the time necessary to verify and attempt to correct prior noted volume corruptions.

20 Claims, 7 Drawing Sheets

PROACTIVE ERROR SCAN AND ISOLATED ERROR CORRECTION

CROSS-REFERENCE TO RELATED APPLICATIONS

This application is related to commonly assigned, co-pending U.S. patent application Ser. No. 12/970,948, entitled "Online Fault Verification In A File System", and commonly assigned, co-pending U.S. patent application Ser. No. 12/970,985, entitled "File System Resiliency Management", each of which is filed herewith and incorporated herein by reference in their entirety.

BACKGROUND

File systems utilize data structures, also referred to as the file system on-disk format, to maintain and organize data on non-volatile, i.e., persistent, storage, e.g., a volume, disk, hard drive, etc. File systems access and interpret these data structures to store and retrieve data for users and applications, or procedures or computer programs, e.g., when executing software instructions or computer code.

Currently, errors, i.e., corruptions, are discovered in the file system data structures when there is an attempt to access and/or interpret the faulty data structure during normal application or user-instigated processing. In the event of such error detection during normal processing, the identified errors are generally discovered at inconvenient and disruptive times, i.e., when users and/or applications are attempting to access and/or use the faulty data structure(s). Even if there is an effort to isolate and correct a reported error online, i.e., a self-healing supported system, some number of encountered corruptions cannot be resolved unless the volume is taken offline. And while the volume is offline the data and information stored thereon in its data structures is unavailable to any user or other application. These offline periods can be lengthy, further degrading system performance and user satisfaction. Thus, the timing of the detection of corruptions and the subsequent correction attempts are themselves relatively disruptive to normal system processing.

Data structure corruptions may also be discovered during a system boot up when the entire file system remains unavailable to users and other applications, i.e., offline, while a check is made of the system's storage volumes. These boot-up events entailing error checking at startup when a user and other applications are precluded from accessing the system's volumes can be time consuming, leading to further performance degradation and user dissatisfaction.

Thus, it is desirable to proactively scan for potential system volume corruptions utilizing a process that minimizes the impact to system performance and user satisfaction. It would also be desirable to shorten the time necessary to correct identified volume corruptions that require offline processing. Moreover, it would be desirable to separate the process of scanning for volume corruptions from the process for the correction of identified corruptions to reduce the amount of downtime when a system's volumes are unavailable to users and other processes.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for proactive error, or corruption, detection and spot corruption processing for volumes of a file system.

In embodiments error scanning is performed for the volumes of a file system in order to proactively identify corruptions thereon. In embodiments the proactive error scanning process involves generating snapshots for volumes of the file system and performing actions on the data structures in the volume snapshots to identify existing corruptions. In embodiments the proactive error scanning process executes while the file system volumes remain online and accessible to other users and tasks.

In embodiments an attempt is made to resolve corruptions that are detected during the proactive error scanning process while the file system volumes remain online and accessible to other users and tasks.

In embodiments corruptions that are detected and remain unresolved during the proactive error scanning process are logged for subsequent efficient attempts to remedy these errors.

In embodiments spot corruption correcting is performed at appropriate times, other than during proactive error scanning processing. In embodiments spot corruption correcting is performed on volumes that have prior determined corruptions thereon. In embodiments spot corruption correcting is performed on one volume at a time while the one volume is maintained offline and all other volumes of the file system remain online and accessible. In embodiments spot corruption correcting is performed to attempt to correct only corruptions on a volume that were previously detected.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
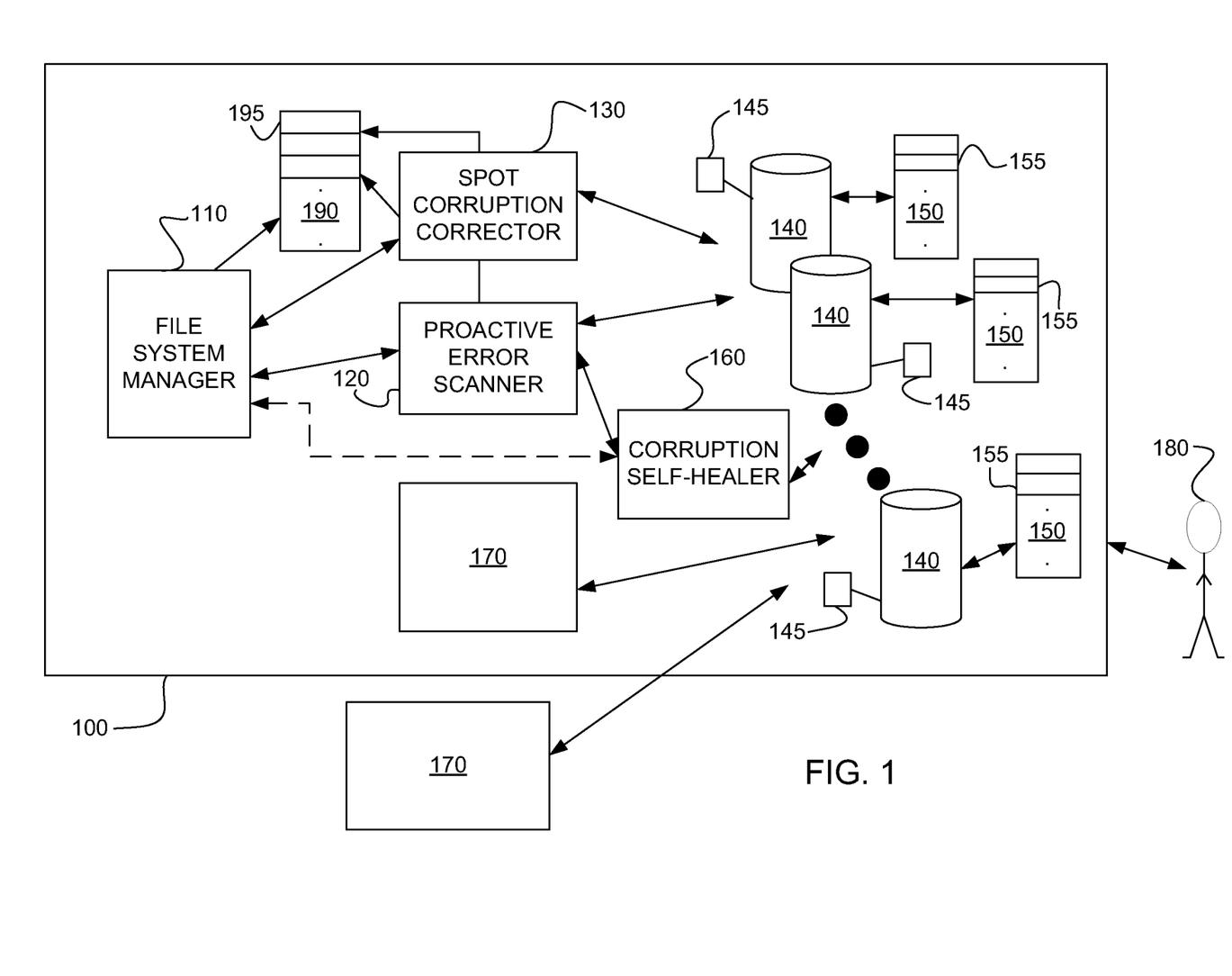
FIG. 1 depicts an embodiment file system that includes proactive error scanning and spot corruption correction.

FIG. 1 depicts an embodiment file system 100 with a file system manager 110. In an embodiment the file system manager 110 is a software application task that has the capability to manage the file system 100 to assist in ensuring proper processing and operation.

In an embodiment the file system 100 has one or more volumes 140 that store data in data structures for use by processing applications, tasks, programs, routines, etc., collectively referred to as processing applications 170 herein, and users 180. In an embodiment one volume 140 is a system volume 140.

In embodiments processing applications, or tasks, 170 that access one or more volumes 140 of the file system 100 can be part of the file system 100 and/or separate from the file system 100.

An embodiment file system 100 has a proactive error scanner component 120. In an embodiment the proactive error scanner 120 is a software application task that is initiated to execute by the file system 100 and has the capability to proactively scan, i.e., check, for errors, or corruptions, associated with the data structures stored on the file system's volumes 140. In an embodiment the proactive error scanner 120 performs actions that are designed to identify, i.e., detect, corruptions on the volumes 140 of the file system 100. In an aspect of this embodiment these actions include reading the data structures of a volume 140 and checking whether, or otherwise verifying that, the volume's data structures are internally consistent.

In an embodiment the proactive error scanner 120 operates while the file system's volumes 140 remain online, and thus, each of the file system's volumes 140 are available for use by other applications and users 180 while the proactive error scanner 120 is executing. Thus, in an embodiment while the amount of time it takes for the proactive error scanner 120 to perform an online scan of a particular volume 140 of a file system 100 is proportional to the number of files resident on the volume 140 at the time of the scan the volume 140 being scanned remains online and available for other use. In this embodiment the proactive error scanner 120 processing does not affect normal file system 100 availability.

In an embodiment the proactive error scanner 120 is initiated, or otherwise invoked, to run, i.e., execute, upon the detection of a corruption in a volume 140 of the file system 100. In an aspect of this embodiment the file system manager 110 invokes the proactive error scanner 120 to execute when a corruption is encountered in a volume 140.

In a second embodiment the proactive error scanner 120 is initiated to run at identified time intervals if a corruption has been previously detected in at least one volume 140 of the file system 100. In an aspect of this second embodiment the file system manager 110 invokes the proactive error scanner 120 to execute at predetermined periodic time intervals when a corruption has already been detected in at least one volume 140 of the file system 100.

In a third embodiment the file system manager 110 schedules the proactive error scanner 120 to be invoked, at some time interval, e.g., once a day at midnight, once a week on Sunday night at eleven-thirty p.m., once a month on the first Sunday night of the month at one o'clock a.m., etc., as programmed by a system administrator 180 or user 180, also collectively referred to herein as user 180. In an aspect of this third embodiment meaningful defaults are established within the file system 100 for ensuring that the proactive error scanner 120 executes at some time interval, e.g., at least once a month, etc., upon circumstances where other time intervals are not, or not properly, established, e.g., have not been programmed by a user 180, are inappropriate or in error, e.g., only once a year, once every minute, etc., have been inadvertently deleted or corrupted, etc.

In a fourth embodiment the proactive error scanner 120 is launched, i.e., invoked to execute, when commanded by a user 180. In an aspect of this fourth embodiment, a user 180 can issue a command, or provide some input, e.g., a request, collectively referred to herein as a command, for the proactive error scanner 120 to execute. In this aspect of this fourth embodiment, the user command is received by the file system manager 110. In this aspect of this fourth embodiment, upon receiving the user command the file system manager 110 invokes the proactive error scanner 120 to execute.

In an embodiment the proactive error scanner 120 scans for corruptions on all of the file system's volumes 140. In an alternative embodiment the proactive error scanner 120 only scans for corruptions on the volumes 140 of the file system 100 that have previously identified, and still existing, corruptions thereon.

In an embodiment each volume 140 of the file system 100 has an associated volume corrupt log 150, e.g., a $corrupt file, also referred to herein as a error correction log, volume corruption log and/or corrupt log 150, where confirmed, i.e., verified, data structure errors for the respective volume 140 are recorded, or otherwise indicated. In other embodiments confirmed data structure errors, also referred to herein as volume errors or volume corruptions, are reported by the use of other mechanisms, e.g., a single volume corrupt log 150 is utilized to report all volume errors for all volumes 140 of the file system 100, tables are maintained and written to to keep track of volume errors, etc.

In an embodiment each volume 140 has an associated dirty bit, or flag, 145 that, when set, indicates that the volume 140 has at least one verified, i.e., true, existing, corruption on it that has not yet been corrected or otherwise resolved.

An embodiment file system 100 has a spot corruption corrector component 130. In an embodiment the spot corruption corrector 130 is a software application task that is initiated to execute by the file system 100 and has the capability to attempt to correct volume corruptions. In an embodiment the spot corruption corrector 130 operates while the associated volume 140 to be repaired, or otherwise corrected, is offline.

In an embodiment the spot corruption corrector 130 maintains a volume 140 offline only for as long as it is necessary for the spot corruption corrector 130 to attempt to repair previously identified volume corruptions associated with data structures stored thereon. Thus, in an embodiment while the amount of time it takes for the spot corruption corrector 130 to process a volume 140 to attempt to remedy its corruptions is proportional to the number of prior identified corruptions thereon the volume 140 being processed is only offline for the time necessary for the spot corruption corrector 130 to attempt to correct the volume's known corruptions. In this embodiment the spot corruption corrector 130 minimizes the time a volume 140 is offline by only processing known error conditions, and not performing full error scans of a volume 140 that is offline and/or attempting to discover and/or correct new corruptions on a volume 140 that is offline.

In an embodiment the file system manager 110 schedules the execution of the spot corruption corrector 130 to minimize the impact to system processing, availability and user satisfaction. In an embodiment the file system manager 110 schedules the execution of the spot corruption corrector 130 with input from a user 180. In an embodiment the file system manager 110 schedules the execution of the spot corruption corrector 130 based on the nature and severity of identified volume corruptions.

In an embodiment the file system 100 has an event log 190 where events, e.g., verified corruptions, corruption corrections, unresolved corruptions, etc., are reported via, e.g., event log entries 195. In an embodiment event log entries 195 are utilized for communication between the proactive error scanner 120 and the file system manager 110 and for communication between the spot corruption corrector 130 and the file system manager 110. In an embodiment event log entries 195 are utilized by the file system 100 to inform system administrator(s) 180 and/or user(s) 180 of events, e.g., verified corruptions, corruption corrections, unresolved corruptions, etc. In an embodiment event log entries 195 are utilized by the file system 100 for file system 100 analysis, maintenance, error detection and correction, etc. In embodiments event log entries 195 are used for additional, other, additional and/or other combinations of tasks.

An embodiment file system 100 has a corruption self-healer component 160. In an embodiment the corruption self-healer 160 is a software application task that is initiated to execute to attempt to correct volume corruptions with minimal impact on other applications, e.g., processing tasks 170, and users 180. In an aspect of this embodiment the corruption self-healer 160 is activated to process by the proactive error scanner 120. In an alternative aspect of this embodiment the corruption self-healer 160 is activated to process by the file system manager 110. In other alternative aspects of this embodiment the corruption self-healer 160 is activated to process by other and or other combinations of file system 100 components.

In an embodiment the corruption self-healer 160 operates while the associated volume 140 to be repaired, or otherwise corrected, is online and remains available to other applications and users 180.

Figure 2A:
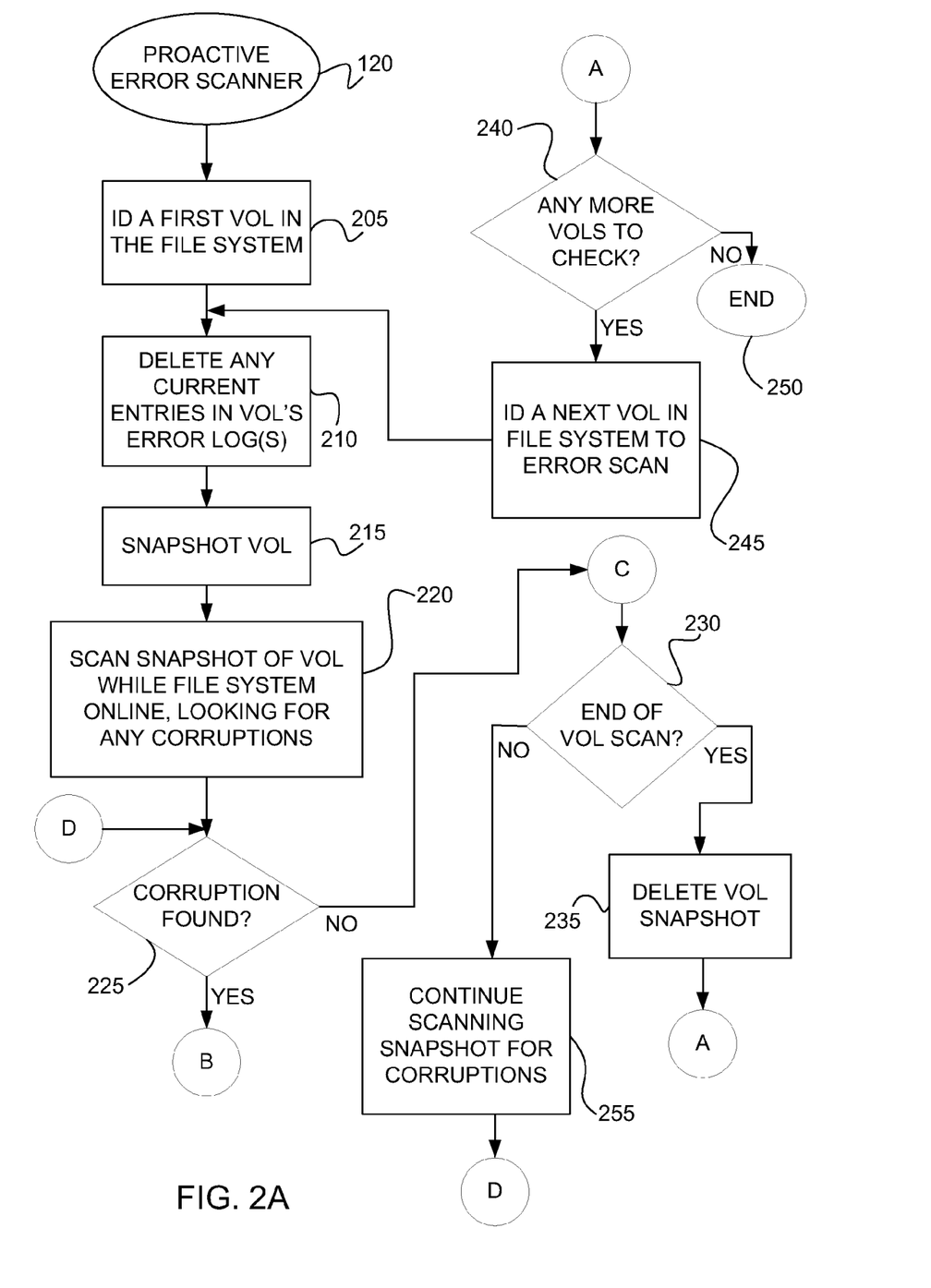
FIGS. 2A-2B illustrate an embodiment logic flow for online proactive error scanning of a file system's data structures.
Figure 2B:
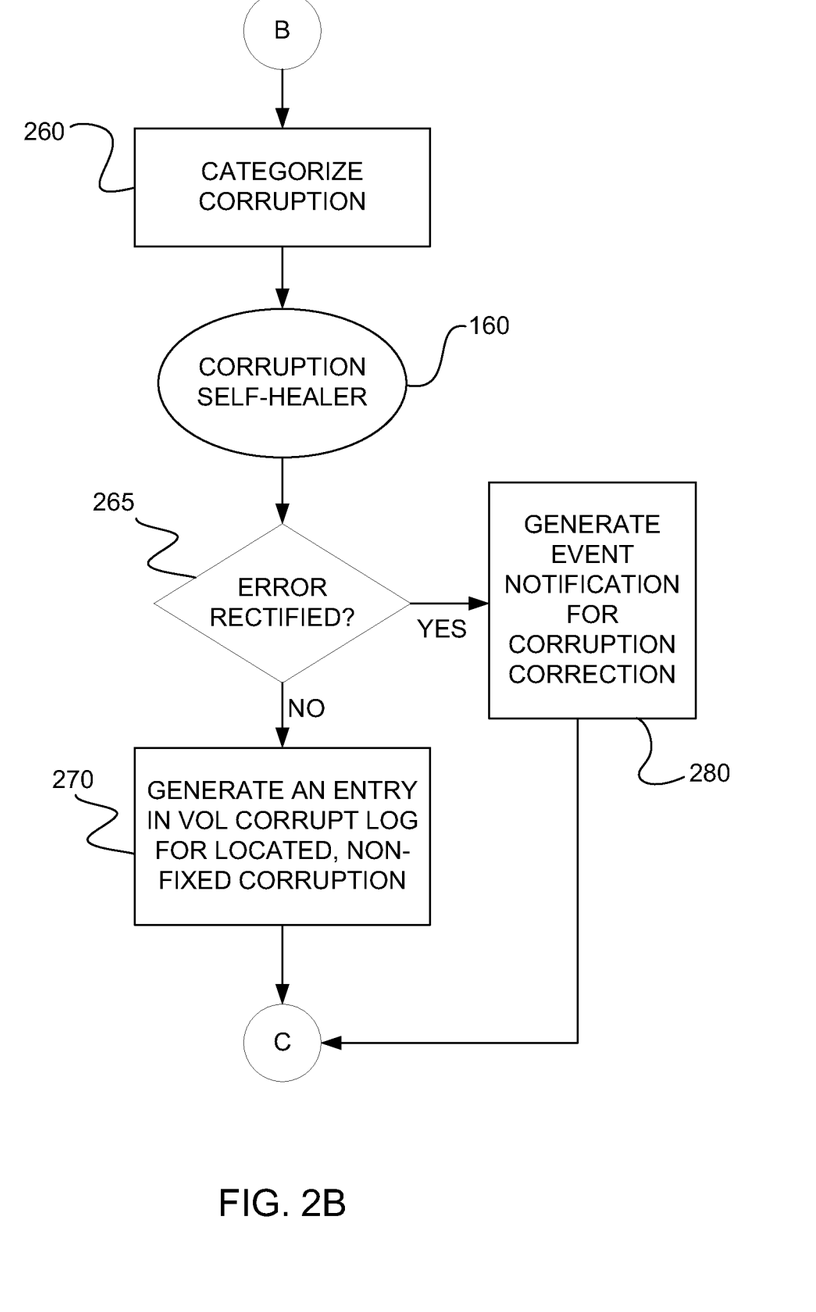

FIGS. 2A-2B illustrate an embodiment logic flow for an embodiment proactive error scanner 120 of the file system 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment proactive error scanner 120 or by an embodiment proactive error scanner 120 in combination with one or more other system entities, components and/or applications or tasks.

Referring to FIG. 2A in an embodiment the proactive error scanner 120 identifies a volume, or a first volume, in the file system 205 to proactively check for errors, or corruptions. In one aspect of this embodiment the proactive error scanner 120 will only be scanning, i.e., checking for corruptions, those volume(s) 140 of the file system 100 that have prior identified, still existing corruptions thereon. In another aspect of this embodiment the proactive error scanner 120 will be scanning all the volumes 140 of the file system 100.

In an embodiment the proactive error scanner deletes the current entries in the identified volume's error log(s) 210, e.g., volume corrupt log 150. In an embodiment, as the proactive error scanner 120 will scan, i.e., check, the current volume 140 for corruptions, the current corruption entries in the volume's error log(s) are not needed, and, in fact, would ultimately be repetitive. This is because in an embodiment corruptions uncovered, or otherwise discovered or encountered, by the proactive error scanner 120 in the volume 140 will be reported in the volume's corrupt log 150 as a result of the proactive error scanner's processing.

In an alternative embodiment the proactive error scanner 120 does not delete the current entries in the identified volume's error log(s). In various aspects of this alternative embodiment the proactive error scanner 120 denotes, or otherwise labels or identifies, the current entries in the identified volume's error log(s) as irrelevant, invalid, old, or non-current.

In a second alternative embodiment the proactive error scanner 120 deletes, or otherwise invalidates, the entries in the identified volume's error log(s) that exist when the proactive error scanner 120 commences processing the identified volume 140, but only after the proactive error scanner 120 completes scanning the current identified volume 140 for errors. In this second alternative embodiment existing error log entries will remain for subsequent file system processing, e.g., attempted correction of the corresponding corruption, even if the proactive error scanner 120 fails to complete its scan of the current identified volume 140.

In an embodiment the proactive error scanner generates a snapshot of the currently identified volume 215. In an embodiment the proactive error scanner thereafter scans the volume snapshot for corruptions while the file system and actual identified volume remain online and accessible to other applications and users 220.

At decision block 225 a determination is made as to whether a corruption in the volume snapshot currently being processed has been found. If no, in an embodiment at decision block 230 a determination is made as to whether the proactive error scanner is at the end of the snapshot of the volume, i.e., has completed scanning the current volume snapshot. If no, in an embodiment the proactive error scanner continues to scan the current volume snapshot for data structure corruptions 255.

If, however, at decision block 230 the current volume snapshot has been completely scanned, then in an embodiment the proactive error scanner deletes the volume's snapshot 235 as it is now no longer needed.

In an embodiment at decision block 240 a determination is made as to whether there are any more volumes of the file system that are to be scanned for corruptions. In one aspect of this embodiment, at decision block 240 a determination is made as to whether there are any other volumes 140 of the file system 100 that currently have unresolved corruptions identified thereon. In an alternative aspect of this embodiment, at decision block 240 a determination is made as to whether there are any other volumes 140 of the file system 100 that the proactive error scanner 120 has not yet processed during its current execution.

If at decision block 240 it is determined that there are no more volumes of the file system that are to be scanned for corruptions at this time, in an embodiment the proactive error scanner has completed its current processing and ends 250.

If, however, at decision block 240 there are still other volumes of the file system to be scanned for corruptions then in an embodiment the proactive error scanner identifies a next volume in the file system to scan for corruptions 245.

Figure 3:
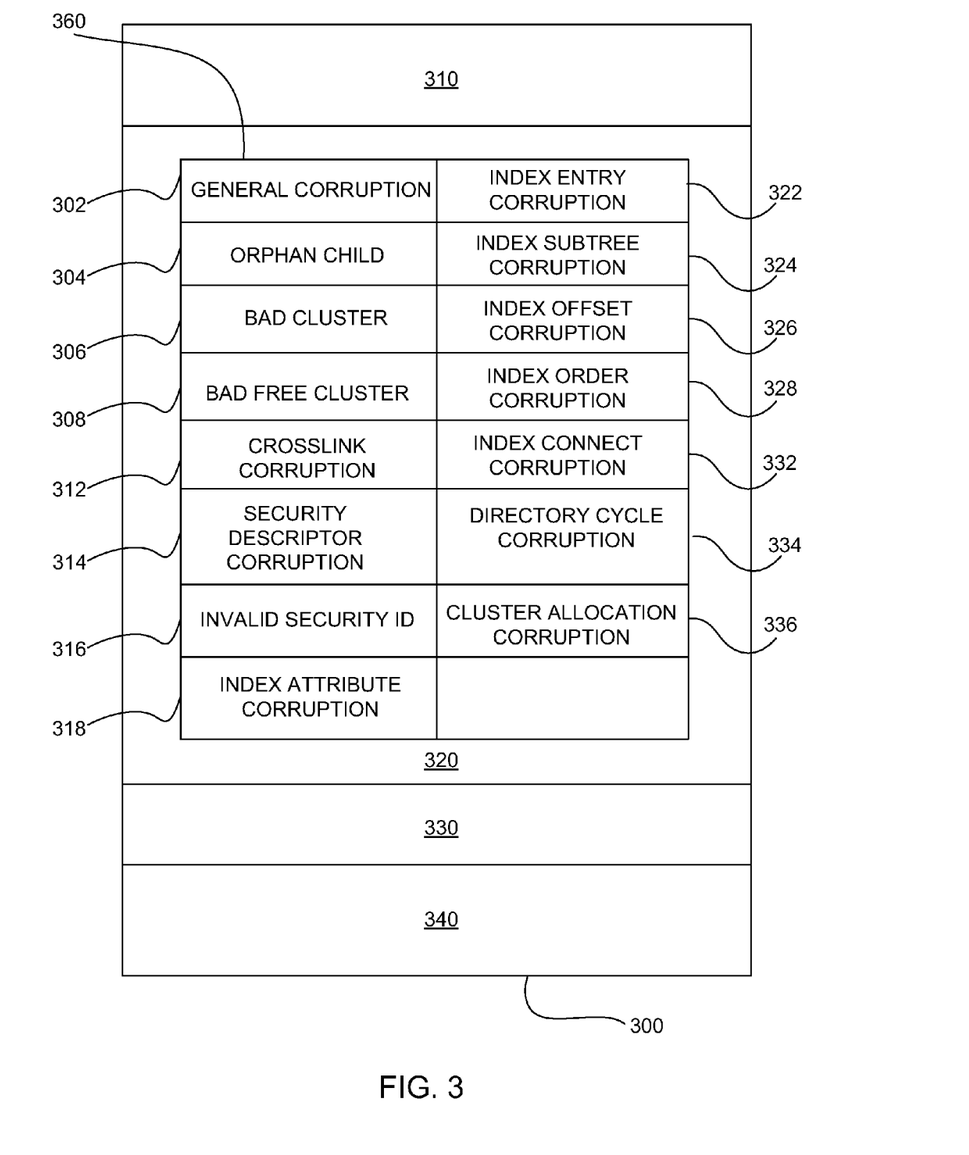
FIG. 3 depicts an exemplary corruption log entry.

Referring again to decision block 225, if a corruption is found in the snapshot of the volume currently being processed then in an embodiment, and referring to FIG. 2B, the corruption is categorized 260, as further discussed below with reference to FIG. 3.

In an embodiment a corruption self-healer process, or application or task, is called, or otherwise activated to process, to attempt to remedy, or otherwise correct, the currently identified volume corruption 160. In an embodiment the proactive error scanner 120 activates the corruption self-healer 160 to process the currently identified volume corruption. In an alternative embodiment the proactive error scanner 120 notifies the file system manager 110 of the identified volume corruption and the file system manager 110 activates the corruption self-healer 160.

In an embodiment at decision block 265 a determination is made as to whether the volume corruption has been remedied, or otherwise rectified. If yes, in an embodiment an event notification is generated for the corruption event 280. In an embodiment the event notification is an entry 195 generated in the file system's event log 190 that identifies that a corruption was corrected.

In an embodiment this event notification can be utilized by a system administrator 180, user 180, the file system manager 110 and/or other file system administrative task(s), other processing tasks 170, etc. for, e.g., reviewing and monitoring the file system 100 processing and/or corruption history, file system maintenance and/or correction, etc.

If at decision block 265 the volume corruption was not remedied by the corruption self-healer 160, in an embodiment the proactive error scanner generates an entry in an error log, e.g., the volume corrupt log, for the volume whose snapshot is currently being scanned 270. In an embodiment the generated error log entry identifies the corruption discovered by the proactive error scanner 120 for the current volume 140 whose snapshot is being processed.

In an alternative embodiment the proactive error scanner 120 notifies the file system manager 110 of the existing corruption and the file system manager 110 generates an entry in the respective volume's corrupt log 150.

After processing a discovered volume corruption, whether or not it is rectified by the corruption self-healer, in an embodiment at decision block 230, depicted in FIG. 2A, a determination is made as to whether the proactive error scanner is at the end of the snapshot of the volume, i.e., has completed scanning the current volume snapshot.

In an embodiment once the proactive error scanner 120 has completed processing and if there are any corruptions identified in any of the volume corrupt logs 150 for any of the volumes 140 that the proactive error scanner 120 just processed the file system manager 110 generates an event notification for the corruption event. In an embodiment the event notification is an entry 195 generated in the file system's event log 190 that identifies that a corruption exists in at least one volume 140 of the file system 100.

In an embodiment the file system manager 110 generates this event notification to apprise the system administrator(s) 180 and/or user(s) 180 that a corruption exists in at least one volume 140 of the file system. In an embodiment the event notification is used by the file system manager 110 to output a message, e.g., via a pop-up text block on a computing device screen, to the system administrator(s) 180 and/or user(s) 180 that informs of the discovered, existing corruption(s).

In an embodiment the event notification can be utilized by a system administrator 180, user 180, the file system manager 110 and/or other file system administrative task(s), other processing tasks 170, etc. for, e.g., reviewing and monitoring the file system 100 processing and/or corruption history, file system maintenance and/or correction, etc.

As previously noted, in an embodiment the proactive error scanner 120 categorizes an discovered volume corruption that cannot be remedied online via, e.g., the corruption self-healer 160. Referring to FIG. 3, an embodiment volume corruption record 300 includes a corruption type field 320. In an embodiment an entry for the corruption type field 320 is generated by the file system 100 component that discovers the volume corruption and generates the volume corruption record 300 that is written to a volume's corrupt log 150, e.g., the proactive error scanner 120. In an embodiment an entry for the corruption type field 320 is generated by the proactive error scanner 120 when the proactive error scanner 120 scans a volume snapshot and discovers a corruption that cannot be successfully remedied by the corruption self-healer 160.

In alternative embodiments an entry for the corruption type field 320 is generated by other file system 100 components after the proactive error scanner 120 identifies a volume corruption, e.g., the corruption type field 320 for a corruption record 300 is generated by the file system manager 110, etc.

In an embodiment a set of categories 360 are identified to be utilized to categorize, or otherwise label, volume corruptions. In an embodiment there are a finite number of categories in the set of categories 360 to help promote efficient and meaningful processing of volume corruptions.

In an embodiment the set of categories 360 includes a general corruption category 302. In an embodiment a general corruption category 302 indicates that some type of corruption was noticed and signifies that an inspection of the entire volume 140 for errors is warranted.

In an embodiment an orphan child category 304 is included in the set of categories 360. In an embodiment file system 100 a collection of one or more files is stored on each volume 140. In an embodiment each file stored on a volume 140 has one or more records and each record consists of one or more segments. In an embodiment each segment consists of one or more fields that each contain data. In an embodiment a file record segment is the smallest element that can be retrieved from a volume 140. In an embodiment each file record consists of a root, or base, parent, etc., segment. In an embodiment each file record can also contain one or more dependent, i.e., child segments. In an embodiment an orphan child category 304 indicates that an in-use child file record segment was located, i.e., there is an existing dependent file record segment that is in use and contains viable data, but that its base, or root, file record segment is either not in use or does not list the child file record as a child.

In an embodiment a bad cluster category 306 is included in the set of categories 360. In embodiment file systems 100 a cluster is the unit of disk space allocation for volume files. To reduce overhead in the management of file system volumes 140, an embodiment file system 100 does not allocate individual disk sectors, but rather, contiguous groups of sectors, called clusters. In an embodiment a cluster is the smallest logical amount of disk space that can be allocated for a file on a volume 140. In an embodiment a bad cluster category 306 indicates that a faulty sector was identified while accessing a cluster of non-resident stream data.

In an embodiment stream data is user data. In an embodiment stream data is stored directly in a file record. In an embodiment non-resident stream data is that user data that is stored in their own clusters rather than directly in a file record. In an embodiment a bad cluster category 306 indicates that it is a user data cluster, where non-resident stream data is stored, that has a corruption.

In an embodiment a bad free cluster category 308 is included in the set of categories 360. In an embodiment a bad free cluster category 308 indicates that a faulty cluster was noticed during the access of a free, i.e., as yet, unused, cluster on the volume 140.

In an embodiment a crosslink corruption category 312 is included in the set of categories 360. In an embodiment a crosslink corruption category 312 indicates that two different extents, e.g., two different volume files, were found to be using logical overlapping clusters, i.e., are using the same or a same portion of the volume's disk space.

In an embodiment a security descriptor corruption category 314 is included in the set of categories 360. In an embodiment a security descriptor corruption category 314 indicates that some type of corruption was noticed in the security descriptor stream. In an embodiment a security descriptor stream for a file on a volume 140 is a set of one or more security attributes, e.g., authorization access rules, associated with the file.

In an embodiment an invalid security identification, or id, category 316 is included in the set of categories 360. In an embodiment an invalid security id category 316 indicates that one or more file records were found to have non-zero security IDs that are not properly registered in a security ID index.

In an embodiment an index attribute corruption category 318 is included in the set of categories 360. In an embodiment file system 100 an index is one or more data structures that are utilized to improve the speed of data, i.e., object, retrievals from the file system volumes 140. In an embodiment an index attribute defines, or otherwise describes, an aspect of the file that the index supports. In an embodiment the index attribute corruption category 318 indicates that a corruption was found in an index attribute which may necessitate the deletion of all attributes related to the respective index.

In an embodiment an index entry corruption category 322 is included in the set of categories 360. In an embodiment an index contains the name of a file and points to the named file on a file system volume 140. In an embodiment the index entry corruption category 322 indicates that there is some type of corruption in the indicated index entry itself.

In an embodiment an index subtree corruption category 324 is included in the set of categories 360. In an embodiment an index subtree corruption category 324 indicates that a subtree index entry refers to a non-existent object.

In an embodiment an index offset corruption category 326 is included in the set of categories 360. In an embodiment an index offset corruption category 326 indicates that an index entry is corrupt. In an aspect of this embodiment an index offset corruption category 326 can further indicate that every subsequent index entry in the same index block is potentially corrupt.

In an embodiment an index order corruption category 328 is included in the set of categories 360. In an embodiment an index order corruption category 328 indicates that an index contains entries that are out of order.

In an embodiment an index connect corruption category 332 is included in the set of categories 360. In an embodiment the index connect corruption category 332 indicates that an index entry refers to a non-existent object, i.e., there appears to be a valid index entry yet it fails to refer to any object. In an embodiment an index connect corruption category 332 indicates that one or more objects ought to be inserted into an index, possibly as a result of, e.g., the recovery of a corrupted index.

In an embodiment a directory cycle corruption category 334 is included in the set of categories 360. In an embodiment file system 100 directories are used to associate files with their respective filenames. In an embodiment a directory cycle corruption category 334 indicates that a directory cycle was found in the file system namespace, i.e., there is an entry in a directory for a volume 140 that identifies an ancestor, i.e., parent, of the directory.

In an embodiment a cluster allocation corruption category 336 is included in the set of categories 360. In an embodiment a cluster allocation corruption category 336 indicates that clusters were found to be in use on the volume 140 but are marked as free, i.e., not in use, for the respective volume.

In an embodiment the format of a volume corruption record 300 is relatively compact in order to conserve space but it is also designed for ease of parsing so that the applications that work with its contents, e.g., an embodiment spot corruption corrector 130, can interpret the record's contents without requiring unnecessarily complicated deserialization operations. In an embodiment the format of a volume corruption record 300 is also flexible to accommodate, e.g., future extensions with minimal data and/or application redesign.

An embodiment volume corruption record 300 is of variable length, binary format. In an embodiment the fields of the volume corruption record 300 are encoded. In an aspect of this embodiment the fields of the volume corruption record 300 are encoded utilizing little endian byte ordering.

An embodiment volume corruption record 300 has a header field 310 which includes an instance tag that uniquely identifies the particular volume corruption record 300. In an embodiment the header field 310 of a volume corruption record 300 also includes the length, e.g., in bytes, of the volume corruption record 300.

An embodiment volume corruption record 300 includes a call stack identification field 330. In an embodiment the call stack identification field 330 contains a data structure entry that describes the kernel call stack at the point when the respective volume corruption was detected. In an embodiment the call stack identification field 330 contains a file identification, id, that uniquely identifies the source file that was executing when the respective volume corruption was detected. In an embodiment the call stack identification field 330 contains an identification of the source line number that was executing when the respective volume corruption was detected. In an embodiment the call stack identification field 330 contains a unique integer for identifying the location in the code base that was executing when the respective volume corruption was detected.

An embodiment volume corruption record 300 includes a binary sample corruption field 340. In an embodiment the binary sample corruption field 340 contains a data structure entry that has an arbitrary sample of binary data that illustrates the respective volume corruption.

The embodiment volume corruption record 300 is also described in an associated patent application entitled "File System Corruption Spot Verification" filed herewith.

Figure 4A:
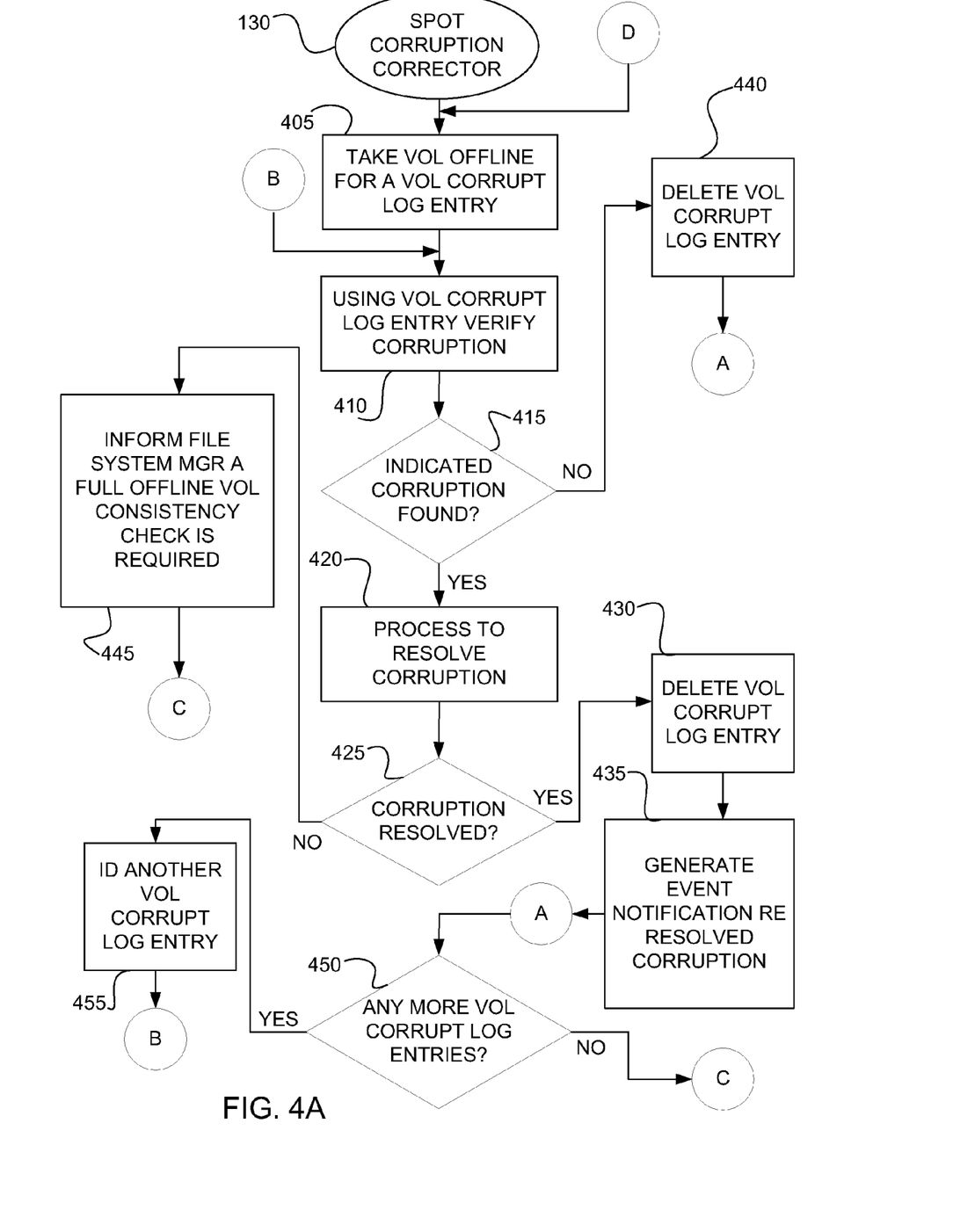
FIGS. 4A-4B illustrate an embodiment logic flow for spot correction of file system volume corruptions.
Figure 4B:
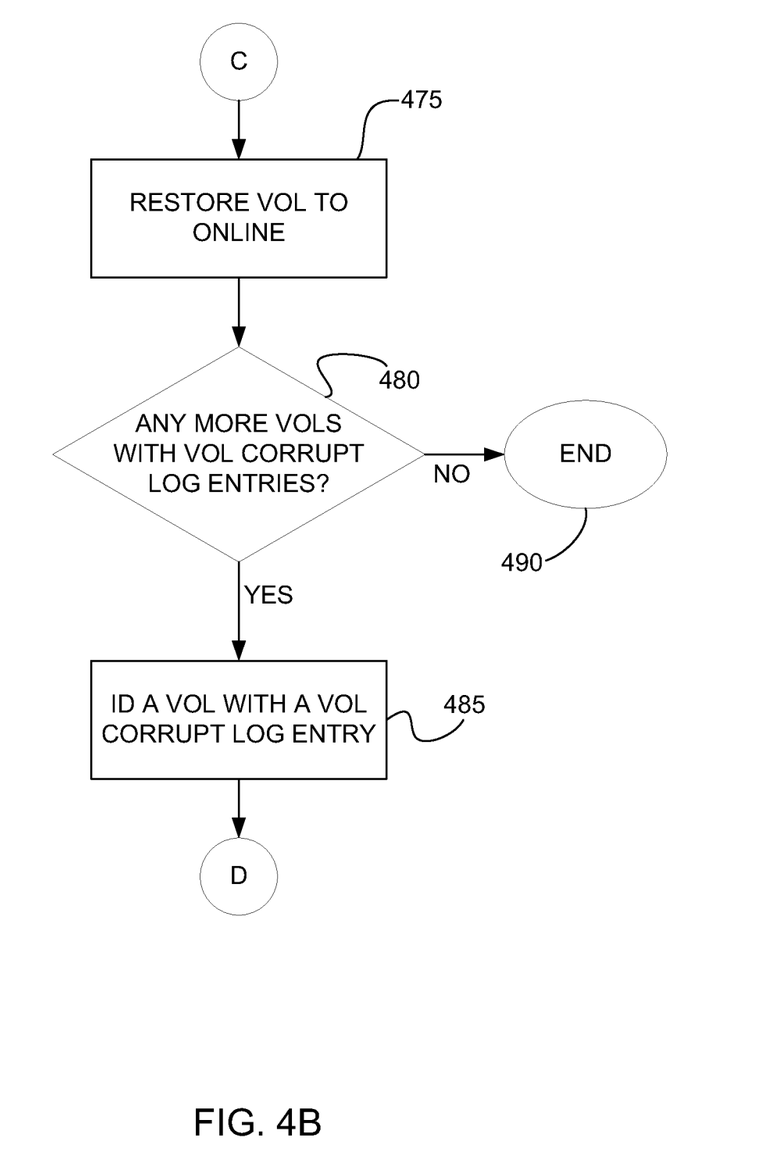

FIGS. 4A-4B illustrate an embodiment logic flow for an embodiment spot corruption corrector 130 of the file system 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment spot corruption corrector 130 or by an embodiment spot corruption corrector 130 in combination with one or more other system entities, components and/or applications.

In an embodiment the spot corruption corrector 130 is activated, or otherwise called to process, by the file system manager 110. In an embodiment the spot corruption corrector 130 is activated when a user 180 requests its invocation. In an aspect of this embodiment a user 180 may request, or otherwise command, the spot corruption corrector 130 be activated at a particular time after receiving a message whose posting to the user 180 was instigated by the proactive error scanner 120 processing, as previously discussed with reference to FIG. 2B herein.

In an embodiment the spot corruption corrector 130 is also, or alternatively, activated at system boot-up time when there is a corrupt log entry 155 for at least one volume 140 of the file system 100. In an embodiment where the file system 100 is a server file system, and bringing it up, i.e., activating for processing, the server file system quickly is important, the spot corruption corrector 130 is activated at server file system boot-up only when there is a corrupt log entry 155 for the system volume 140. In aspects of this embodiment where the file system 100 is a server file system, the spot corruption corrector 130 is activated at other times than server file system boot-up, e.g., during scheduled maintenance timeframes when there is at least one corrupt log entry 155 for at least one volume 140, during scheduled error correction timeframes when there is at least one corrupt log entry 155 for at least one volume 140, etc.

In an embodiment where the file system 100 is a client file system and ease of management and automated repair is important, the spot corruption corrector 130 is activated at client file system boot-up when there is a corrupt log entry 155 for any volume 140 in the client file system 100.

In an embodiment the spot corruption corrector 130 takes a volume that has an error log entry offline 405; e.g., in an embodiment the spot corruption corrector 130 takes a volume 140 with at least one entry in its corresponding corrupt log, e.g., $corrupt, 150 offline 405.

In an embodiment and using information in the corrupt log entry currently being processed the spot corruption corrector attempts to verify the identified logged corruption 410.

At decision block 415 a determination is made as to whether the spot corruption corrector has independently verified the logged corruption in the offline volume. If no, in an embodiment it is assumed that the identified volume error does not in fact exist. In an embodiment the spot corruption corrector deletes the volume corrupt log entry it has currently been processing 440.

In embodiments, a prior identified volume error may not be able to be verified 410 by the spot corruption corrector 130 for one or more of a number of reasons. These reasons can include, but are not limited to, the volume 140 was changed between when the corruption was previously identified, e.g., by the proactive error scanner 120, and now when the spot corruption corrector 130 is processing to verify the corruption, in such a manner that the corruption no longer exists; the portion of the volume 140 with the prior identified corruption was deleted prior to the execution of the spot corruption corrector 130; etc.

In an embodiment at decision block 450 a determination is made as to whether there are any more volume corrupt log entries for the volume corrupt log currently being processed. If yes, in an embodiment the spot corruption corrector identifies another entry in the volume corrupt log to process 455, and, utilizing information in the newly identified corrupt log entry the spot corruption corrector attempts to verify the identified logged corruption 410.

If at decision block 415 the spot corruption corrector has independently verified the logged corruption in the offline volume then in an embodiment the spot corruption corrector works to resolve the logged corruption 420.

In an embodiment at decision block 425 a determination is made as to whether the spot corruption corrector successfully corrected the logged corruption for the associated volume. If yes, in an embodiment the spot corruption corrector deletes the volume corrupt log entry it has currently been processing 430.

In an embodiment the spot corruption corrector generates an event notification for the corrected volume corruption 435. In an embodiment the event notification is an entry 195 generated in the file system's event log 190 that identifies that a corruption was corrected in a respective file system volume 140.

In an embodiment the report notification can be utilized by a system administrator 180, user 180, the file system manager 110 and/or other file system administrative task(s), other processing tasks 170, etc. for, e.g., reviewing and monitoring the file system 100 processing, corrective action and/or corruption history, etc.

In an embodiment the event notification is also, or alternatively, used by the file system manager 110 to output a message, e.g., via a pop-up text block on a computing device screen, to the system administrator(s) 180 and/or user(s) 180 that informs of the corrected corruption. In an alternative embodiment, all event notifications generated during an execution of the spot corruption corrector 130 are used by the file system manager 110 subsequent to the execution of the spot corruption corrector 130 to output a message, or series of messages, e.g., via a pop-up text block on a computing device screen, to the system administrator(s) 180 and/or user(s) 180 that informs of the corrected corruptions.

In an embodiment at decision block 450 a determination is made as to whether there are any more volume corrupt log entries for the volume corrupt log currently being processed.

If at decision block 425 the spot corruption corrector could not resolve the logged corruption that it is currently processing then in an embodiment the spot corruption corrector 130 notifies the file system manager that a full offline volume consistency check ought to be performed to resolve the outstanding volume corruption 445. In an embodiment a full offline volume consistency check, also referred to herein as a full check disk action, involves exclusively locking, i.e., taking offline, the volumes 140 of the file system 100 that have unresolved data structure corruptions thereon, and executing a full diagnostic and any necessary remedial processes thereon. In an embodiment the length of time for a full check disk action is dependent on the number of volumes 140 that have unresolved corruptions and the number and severity of the corruptions. In embodiments a full check disk action can be time consuming. In an embodiment a full check disk action is a last resort effort to resolve any still existent volume corruptions.

In an embodiment, the file system manager 110, upon being notified that a full offline volume consistency check ought to be performed, sets a file system state, e.g., sets the appropriate volume's dirty bit 145, that will trigger, or otherwise cause, the file system 100 to execute a full check disk action on the volume 140 at the next system boot up.

In an embodiment, the file system manager 110, upon being notified that a full offline volume consistency check ought to be performed on a volume 140 of the file system 100, notifies a system administrator 180 or user 180 that there is a volume 140 of the file system 100 with at least one unresolved corruption thereon. In an aspect of this embodiment, the administrator 180, or user 180, can request, or otherwise command, the file system 100 to perform a full check disk action on the volume 140 with the unresolved corruption immediately, or at some other administrator 180 or user 180 specified time.

In an embodiment at decision block 450 a determination is made as to whether there are any more volume corrupt log entries for the volume corrupt log currently being processed.

Once the spot corruption corrector notifies the file system manager that a full offline volume consistency check is required for a volume 445, or if at decision block 450 there are no more volume corrupt log entries for the corrupt log currently being processed, then in an embodiment, and referring to FIG. 4B, the spot corruption corrector restores the volume currently being processed to online 475. In an aspect of this embodiment the currently restored online volume 140 is thereafter available for use by other applications, e.g., processing tasks 170, and users 180.

In an embodiment at decision block 480 a determination is made as to whether there are any more corrupt logs for any other of the system's volumes that currently have valid entries therein. If yes, in an embodiment the spot corruption corrector identifies another volume with corrupt log entries 485, and, referring again to FIG. 4A, exclusively locks the newly identified volume, i.e., takes the volume offline 405.

If at decision block 480 of FIG. 4B there are currently no more corrupt logs with entries therein then in an embodiment the spot corruption corrector processing ends 490.

Computing Device System Configuration

Figure 5:
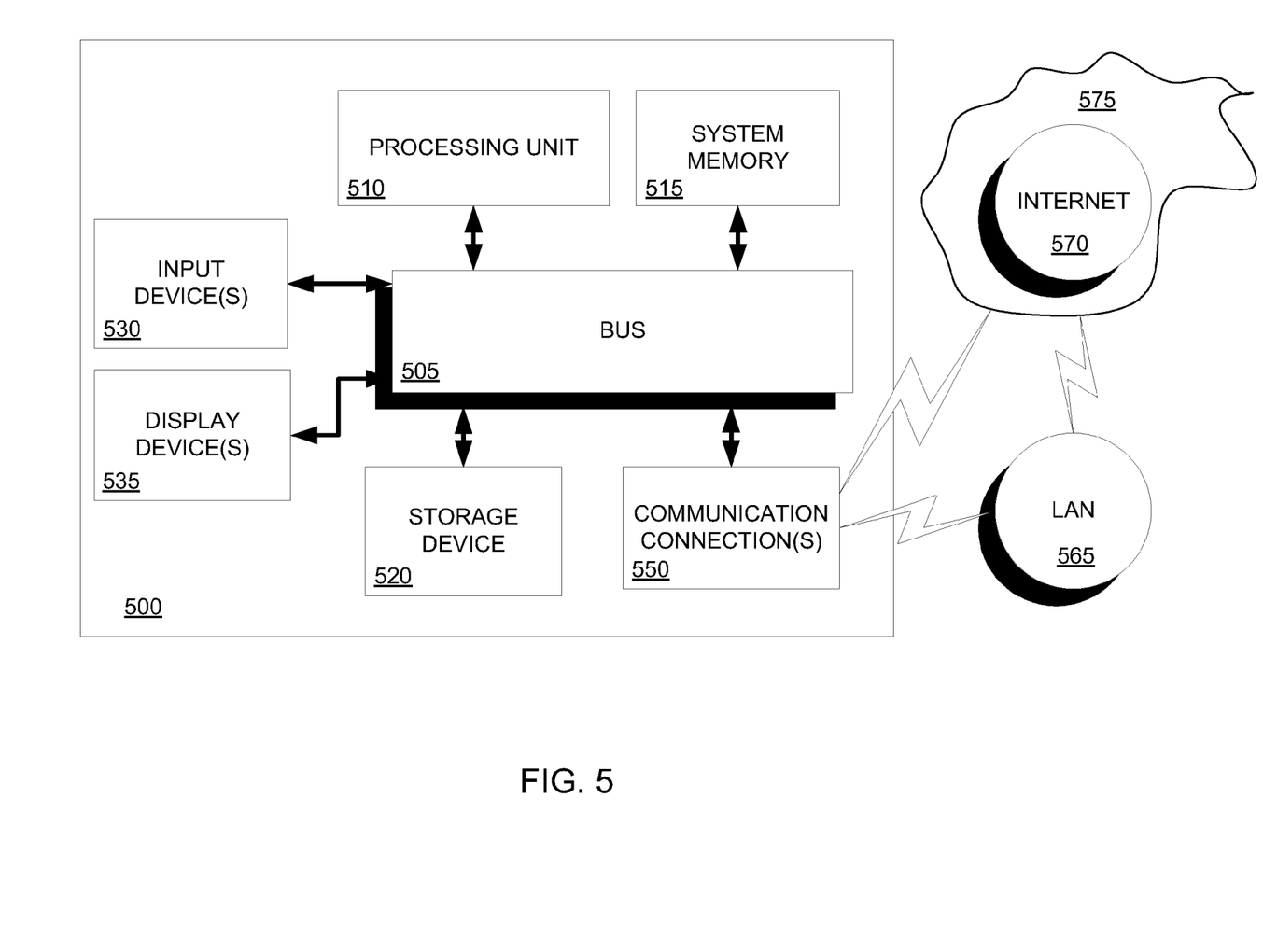
FIG. 5 is a block diagram of an exemplary basic computing device with the capability to process software, i.e., program code, or instructions.

FIG. 5 is a block diagram that illustrates an exemplary computing device system 500 upon which an embodiment can be implemented. Examples of computing device systems, or computing devices, 500 include, but are not limited to, servers, server systems, computers, e.g., desktop computers, computer laptops, also referred to herein as laptops, notebooks, etc.; etc.

The embodiment computing device system 500 includes a bus 505 or other mechanism for communicating information, and a processing unit 510, also referred to herein as a processor 510, coupled with the bus 505 for processing information. The computing device system 500 also includes system memory 515, which may be volatile or dynamic, such as random access memory (RAM), non-volatile or static, such as read-only memory (ROM) or flash memory, or some combination of the two. The system memory 515 is coupled to the bus 505 for storing information and instructions to be executed by the processing unit 510, and may also be used for storing temporary variables or other intermediate information during the execution of instructions by the processor 510. The system memory 515 often contains an operating system and one or more programs, or applications, and/or software code, and may also include program data.

In an embodiment a storage device 520, such as a magnetic or optical disk, solid state drive, flash drive, etc., is also coupled to the bus 405 for storing information, including program code of instructions and/or data, e.g., volumes 140. In the embodiment computing device system 500 the storage device 520 is computer readable storage, or machine readable storage, 520.

Embodiment computing device systems 500 generally include one or more display devices 535, such as, but not limited to, a display screen, e.g., a cathode ray tube (CRT) or liquid crystal display (LCD), a printer, and one or more speakers, for providing information to the computing device's system administrators 180 and users 180. Embodiment computing device systems 500 also generally include one or more input devices 530, such as, but not limited to, a keyboard, mouse, trackball, pen, voice input device(s), and touch input devices, which the system administrators 180 and users 180 can utilize to communicate information and command selections to the processor 510. All of these devices are known in the art and need not be discussed at length here.

The processor 510 executes one or more sequences of one or more programs, or applications, and/or software code instructions contained in the system memory 515. These instructions may be read into the system memory 515 from another computing device-readable medium, including, but not limited to, the storage device 520. In alternative embodiments, hard-wired circuitry may be used in place of or in combination with software instructions. Embodiment computing device system 500 environments are not limited to any specific combination of hardware circuitry and/or software.

The term "computing device-readable medium" as used herein refers to any medium that can participate in providing program, or application, and/or software instructions to the processor 510 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 515 and storage device 520 of embodiment computing device systems 500 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device system 500 also includes one or more communication connections 550 coupled to the bus 505. Embodiment communication connection(s) 550 provide a two-way data communication coupling from the computing device system 500 to other computing devices on a local area network (LAN) 565 and/or wide area network (WAN), including the world wide web, or internet, 570 and various other communication networks 575, e.g., SMS-based networks, telephone system networks, etc. Examples of the communication connection(s) 550 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 500 can include program, or application, and/or software instructions and data. Instructions received by the embodiment computing device system 500 may be executed by the processor 510 as they are received, and/or stored in the storage device 520 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for corruption maintenance processing for volumes of a file system, wherein the file system comprises a volume and a data structure, the method comprising:

processing the volume of the file system wherein the processing comprises identifying a data structure corruption that exists within the volume and wherein the processing is performed while the volume is maintained online;

attempting to remedy the data structure corruption that is identified during the processing of the volume, wherein the attempt to remedy the data structure corruption is performed while the volume is maintained online;

generating an indication for the data structure corruption that is identified during the processing of the volume;

causing the volume to go offline at a time subsequent to the generation of the indication for the data structure corruption;

processing to attempt to correct the data structure corruption utilizing the generated indication for the data structure corruption while the volume remains offline;

restoring the volume online subsequent to correcting or failing to correct the data structure corruption.

2. The method for file system volume corruption maintenance processing of claim 1, further comprising:
processing each volume of the file system during a first time interval wherein the processing comprises performing actions designed to identify data structure corruptions that currently exist on the volume, and wherein the processing of each volume of the file system is performed while all volumes of the file system are maintained online;
attempting to remedy at least one data structure corruption that is identified during the processing of the volume of the file system during the first time interval, wherein the attempt to remedy the data structure corruption is performed while the volume with the data structure corruption is maintained online; and
generating an indication for each data structure corruption on the volume that is identified during the processing of each volume during the first time interval and which is not remedied during the first time interval.

3. The method for file system volume corruption maintenance processing of claim 2, further comprising:
for a first volume for which at least one indication of a data structure corruption has been generated during the first time interval, causing the first volume to go offline at a second time interval that is subsequent to the first time interval while all other file system volumes are maintained online;
processing the first volume during the second time interval to attempt to correct the data structure corruption that exists on the first volume; and
restoring the first volume online prior to the end of the second time interval wherein the end of the second time interval comprises a time when an attempt has been made to remedy the data structure corruption that exists on the first volume.

4. The method for file system volume corruption maintenance processing of claim 3, wherein the file system further comprises volume corrupt logs for the volumes of the file system, respectively, and wherein the generated indication for the data structure corruption identified on the a volume comprises an entry in the volume corrupt log for the volume with the identified data structure corruption.

5. The method for file system volume corruption maintenance processing of claim 3, wherein the second time interval is a predetermined error correction time interval for processing at least the first volume to attempt to correct all data structure corruptions that exist on the first volume.

6. The method for file system volume corruption maintenance processing of claim 3, wherein the second time interval is a predetermined error correction time interval for processing all volumes that have identified data structure corruptions in an attempt to correct data structure corruptions that exist on each volume of the file system and for which an indication of data structure corruption was previously generated, further comprising:
for each volume for which at least one data structure corruption has been previously generated, for a given volume, causing the given volume to go offline during the second time interval while all other file system volumes are maintained online;
processing each volume during the second time interval to attempt to correct at least; one data structure corruption thereon; and
restoring each volume online prior to the end of the second time interval.

7. The method for file system volume corruption maintenance processing of claim 6, further comprising processing each volume during the second time interval to attempt to correct each existing data structure corruption that exists thereon.

8. The method for file system volume corruption maintenance processing of claim 7, wherein the end of the second time interval comprises a time when each volume with a corresponding indication of data structure corruption as been processed to attempt to correction thereof.

9. The method for file system volume corruption maintenance processing of claim 3, wherein the second time interval is initiated at the request of a user of the file system.

10. The method for file system volume corruption maintenance processing of claim 1, further comprising categorizing the data structure corruption for assistance in the processing to attempt to correct the data structure corruption.

11. The method for file system volume corruption maintenance processing of claim 1, wherein the processing of the volume is initiated at the command of a user.

12. A storage device storing a file system that supports proactive corruption detection and spot corruption correction, the file system comprising:
volumes stored on the storage device, wherein the volumes comprises respective data structures;
a proactive error scanner that processes the volumes of the file system to detect existing data structure corruptions comprising detected data structure corruptions, wherein the proactive error scanner processes while the volumes of the file system are simultaneously maintained online, and wherein the proactive error scanner processes during a proactive error scanner time interval;
a corruption self-healer that processes detected data structure corruptions to attempt to remedy the detected data structure corruptions on a volume of the file system while the volume of the file system is maintained online, and wherein a detected data structure corruption that is not remedied by the processing of the corruption self-healer comprises an identified data structure corruption; and
a spot corruption corrector comprising the capability to process the volumes of the file system to attempt to correct identified data structure corruptions, wherein the spot corruption corrector processes volumes that are offline, wherein the spot corruption corrector processes one volume at a time during a time interval while all other volumes of the file system are maintained online during the same time interval, and wherein the spot corruption corrector processes during a time interval that is different than a proactive error scanner time interval.

13. The storage device according to claim 12, wherein the file system further comprises a file system manager that invokes the proactive error scanner to process the volumes of the file system to detect existing data structure corruptions and invokes the spot corruption corrector to process detected data structure corruptions to attempt to remedy the detected data structure corruptions on a volume of the file system.

14. The storage device according to claim 13, wherein the spot corruption corrector is invoked to process at a system boot up time when there is an identified data structure corruption on the volume of the file system.

15. The storage device according to claim 13, wherein the file system has at least one user, and wherein the spot corruption corrector is invoked to process upon a request of a user to attempt to correct at least one existing data structure corruption for at least one volume of the file system that has a prior identified data structure corruption.

16. The storage device according to claim 13, the file system further comprising a volume corrupt log for each volume of the file system, wherein an entry of a volume corrupt log is generated upon the proactive error scanner detecting an existing data structure corruption on the volume that cannot be successfully remedied while the volume is maintained online.

17. The storage device according to claim 12, wherein the proactive error scanner is invoked to process at a predetermined periodic time interval when at least one data structure corruption has been encountered on a volume of the file system and the at least one data structure corruption has not been corrected prior to the current predetermined periodic time interval.

18. A method for file system volume maintenance, wherein the file system comprises one volumes, and wherein a corruption indication identifies a corruption on a volume of the file system, the method comprising:

processing each volume of the file system in a first time interval for corruption detection wherein the corruption detection comprises performing at least one action to identify corruptions that exist on the volume, and wherein the processing for corruption detection is performed while all the volumes of the file system are maintained online;

generating a corruption indication for each corruption that is identified during the processing for corruption detection and that remains as an existing corruption at the end of the processing for corruption detection;

causing each volume that has an identified corruption with a corresponding generated corruption indication to go offline during a second time interval that is different than the first time interval, wherein one volume is caused to go offline at a time while all other volumes of the file system are maintained online;

processing each volume that is caused to go offline to attempt to correct at least one identified corruption thereon for which there is a corresponding generated corruption indication; and restoring online each volume that has been caused to go offline subsequent to processing the volume to attempt to correct at least one identified corruption thereon for which there is a corresponding generated corruption indication and prior to causing any other volume of the file system to go offline.

19. The method for file system volume maintenance of claim 18, further comprising rendering irrelevant corruption indications that identify a corruption on a volume and that exist prior to processing each volume of the file system in the first time interval for corruption detection.

20. The method for file system volume maintenance of claim 18, wherein each volume has a respective volume corrupt log associated therewith, and wherein a given generated corruption indication comprises an entry in a volume corrupt log.

* * * * *